United States Patent
Ostlind

(10) Patent No.: US 9,470,253 B2
(45) Date of Patent: Oct. 18, 2016

(54) FITTING FOR SUCTION CUP AND SUCTION CUP

(71) Applicant: Xerex AB, Taby (SE)

(72) Inventor: Erik Ostlind, Akersberga (SE)

(73) Assignee: Xerex AB, Taby (SE)

( * ) Notice: Subject to any disclaimer, the term of this patent is extended or adjusted under 35 U.S.C. 154(b) by 0 days.

(21) Appl. No.: 14/948,484

(22) Filed: Nov. 23, 2015

(65) Prior Publication Data
US 2016/0146236 A1     May 26, 2016

(30) Foreign Application Priority Data

Nov. 21, 2014   (EP) .................................... 14194332

(51) Int. Cl.
   *B65G 15/48*         (2006.01)
   *B65G 17/46*         (2006.01)
   *F16B 2/22*          (2006.01)
   (Continued)

(52) U.S. Cl.
CPC ................ *F16B 2/22* (2013.01); *B65G 15/58* (2013.01); *B65G 17/46* (2013.01); *F16B 17/00* (2013.01); *F16B 47/00* (2013.01); *F16M 13/02* (2013.01)

(58) Field of Classification Search
CPC .......... F16B 2/22; F16B 17/00; F16B 47/00; B65G 15/58; B65G 17/46; B65G 17/323; B65G 47/91; F16M 13/03
USPC .................... 198/689.1, 471.1, 867.03, 803.5
See application file for complete search history.

(56) References Cited

U.S. PATENT DOCUMENTS 2,921,667 A *   1/1960   Willsey ................. A47J 43/145
                                               198/803.5
3,628,654 A *   12/1971   Haracz ................... B65G 17/46
                                               198/689.1

(Continued)

FOREIGN PATENT DOCUMENTS

CN        102 424 271 A     4/2012
DE        19 23 440 A1     11/1970

(Continued)

OTHER PUBLICATIONS

Extended European Search Report for European Application No. 14194332.4 dated May 12, 2015.

*Primary Examiner* — Mark A Deuble
(74) *Attorney, Agent, or Firm* — Renner, Otto, Boisselle & Sklar, LLP

(57) ABSTRACT

Push-on fitting (10) for a push-on suction cup (20) for a conveyor belt (30) for transporting or lifting goods, which push-on fitting (10) comprises a base disc (12) having a front side (11) and a rear side (13) and being adapted to be mounted in a hole (32) of the conveyor belt (30), said base disc (12) having a hole (15) for through airflow and being provided with a hollow push-on snap fitting pin (14) for through airflow, said pin (14) extending outwardly essentially perpendicular to the front side (11) and adapted to receive a push-on suction cup (20), wherein the snap fitting pin (14) comprises at least a pair of axial slots (16) adapted to provide at least a pair of flexible tongues (14a, 14b) formed in an end (17) of the pin (14) and in that the flexible tongues comprise a concentric snap fitting rim (18) having a variable diameter (D1), that can be varied by an end (19) part of the flexible tongues (14a, 14b) being acted upon, for receiving the push-on suction cup (20) provided with a washer (22) having a mounting hole (23) with a diameter (D2) smaller than a largest diameter (D1) of the rim (14c).

7 Claims, 2 Drawing Sheets

(51) Int. Cl.
  *B65G 15/58*   (2006.01)
  *F16B 47/00*   (2006.01)
  *F16B 17/00*   (2006.01)
  *F16M 13/02*   (2006.01)

(56) References Cited

U.S. PATENT DOCUMENTS

| | | | | |
|---|---|---|---|---|
| 3,985,096 | A | * | 10/1976 | Guimbretiere ......... G01N 1/312 118/236 |
| 4,222,479 | A | * | 9/1980 | Dugan .................... B41F 17/14 101/40 |
| 2003/0019729 | A1 | * | 1/2003 | Janzen ................... B65G 15/58 198/689.1 |
| 2011/0214258 | A1 | * | 9/2011 | Seymour ................ B65H 75/18 24/115 F |
| 2013/0036887 | A1 | * | 2/2013 | Moore ................. B65H 29/241 83/100 |
| 2014/0217251 | A1 | * | 8/2014 | Cheng ..................... F16B 47/00 248/205.3 |

FOREIGN PATENT DOCUMENTS

| | | |
|---|---|---|
| DE | 299 15 602 U1 | 3/2000 |
| EP | 1 092 657 A1 | 4/2001 |
| JP | 2003 071768 A | 3/2003 |

\* cited by examiner

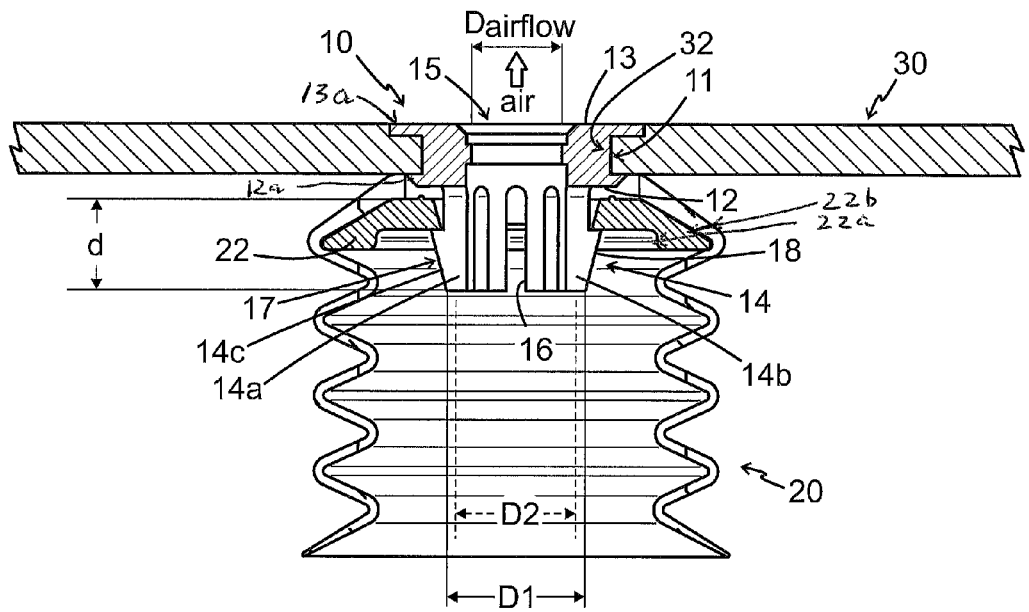
FIG. 1
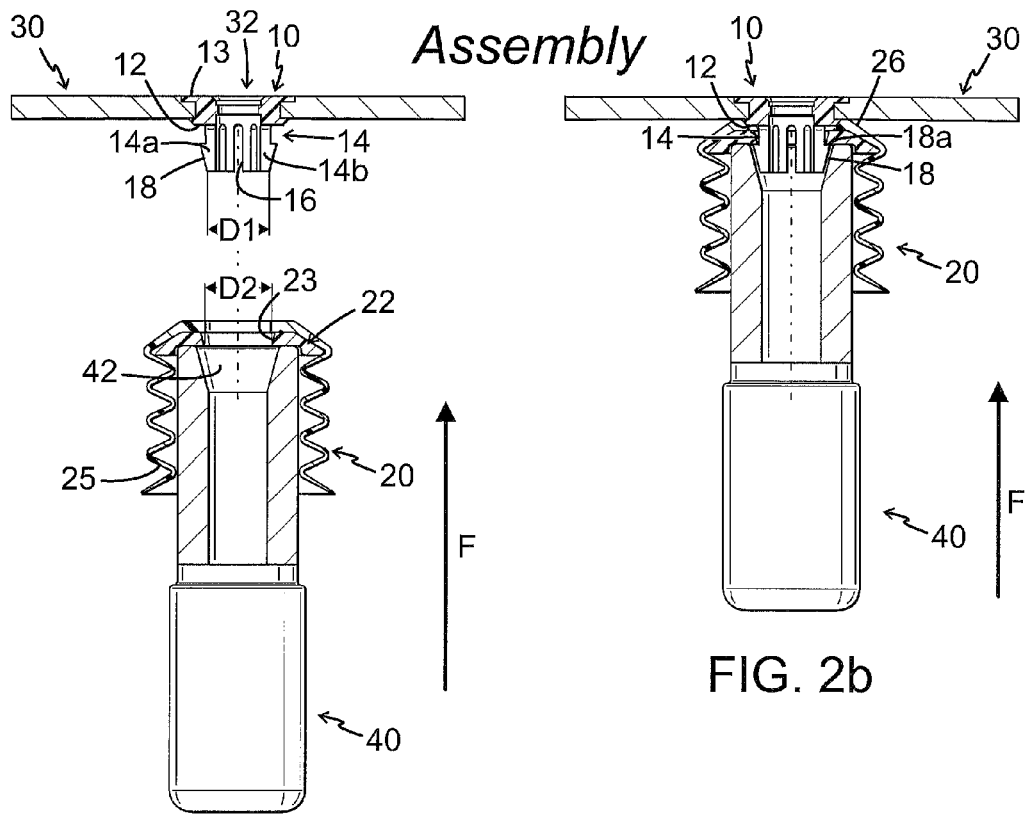
FIG. 2a
FIG. 2b

Disassembly

*At release washer 22 jumps over edge 18a*

*Friction*

FITTING FOR SUCTION CUP AND SUCTION CUP

This application claims priority of European Application No. 14194332.4 filed Nov. 21, 2014, which is hereby incorporated herein by reference.

TECHNICAL HELD

The present invention is related to a fitting for a suction cup and a suction cup, in particular to a push-on fitting and push-on suction cup used in a conveyor belt for transporting and/or lifting goods.

BACKGROUND

Suction cups are used in vacuum transporting and/or lifting systems, wherein a plurality of suction-cups are provided on a conveyor belt or other transporting devices for lifting and/or transporting goods. Examples of technical fields employing vacuum transporting and/or lifting systems using conveyor belts or other devices provided with a plurality of suction-cups are industrial baking equipment. Particular applications of industrial baking equipment are so-called "depanners" for high volume production of bakery products, wherein a vacuum removal system having suction cups mounted on a conveyor belt are provided for lifting ("depanning") bakery products from a pan. But, vacuum transporting and/lifting systems having suction-cups provided on a conveyor belt or other transporting devices for lifting and/or transporting goods are also known for other technical fields of application.

The suction cups can be mounted to the conveyor belt or to another suitable transporting device by means of suction cup fittings for holding the suction cups when assembled/mounted to the conveyor belt. Since the number of fittings and suction cups are typically (very) large, assembling/disassembling typically involves time-consuming work, say a whole day or even longer to shift cups. Typically, when servicing or repairing the suction cups, the suction cups are removed from the fittings by an operator or service personnel, typically manually. The fittings available can be of so-called "threaded" or "push-on" type. As regards the "threaded fittings", the suction cups have to be screwed onto these when assembling (mounting) the suctions cups to the fittings.

A drawback with fittings of threaded type is time-consuming assembling/disassembling, in particular if the number of fittings and suction cups are (very) high since typically each suction cup has to be screwed or unscrewed manually and a large number of suction cups thus imply much manual labour in total.

Therefore, other types of fittings have found use such as fittings of "push-on" type, wherein the suction cups are mounted/assembled to the fittings by an operator or service personnel pushing the suction cups onto the fitting and dismounted/disassembled by pulling the suction cups off the fittings. A drawback is however, that also this procedure may be labour intensive and time-consuming if assembling/disassembling is cumbersome. Sometimes the suction cups are difficult to dismount/mount even for a skilled operator or service personnel. Another drawback is that suction cups may come loose during operation of the transporting/lifting system if the fittings and suction cups are not assembled properly or if the assembly is not resistant enough, for instance to forces acting on the suction cups assembled during operation of the transporting and/or lifting system.

Thus, it is normally important that the suction cups are also properly mounted and that the fitting is able to hold the cups firmly and resistant enough to all types of forces acting thereon.

SUMMARY

It is the object of the invention to provide an improved push-on fitting for a suction cup and push-on suction cup of the above type, which do not require intensive labor during assembling/disassembling. This object is obtained by the solutions according to various aspects of the present invention as follows below.

According to a first aspect and an embodiment of the present invention, there is provided a push-on fitting for a push-on suction cup for a conveyor belt for transporting and/or lifting goods. The push-on fitting comprises a base disc having a front side and a rear side and is adapted to be mounted in a hole of the conveyor belt. The base disc has a hole for through airflow and is provided with a hollow push-on snap fitting pin for through airflow. The snap fitting pin extends outwardly essentially perpendicular to the front side of the base disc and is adapted to receive a push-on suction cup. The snap fitting pin comprises at least a pair of axial, axially in relation to an axis of the pin, slots adapted to provide at least a pair of flexible tongues formed in an end of the snap fitting pin. The flexible tongues comprise a concentric snap fitting rim having a variable diameter that can be varied by an end part of the flexible tongues being acted upon, for receiving the push-on suction cup provided with a push-on base part, such as washer, having a mounting hole with a diameter smaller than a largest diameter of the rim.

Herein, the term "conveyor belt" includes any type of transporting device that can be used instead of a conveyor belt providing the same technical functionality.

Herein, a definition of "push-on" fitting and suction cup is intended to mean that the suction cups are mounted/assembled to the fittings by pushing the suction cups onto the fitting and dismounted/disassembled by pulling the suction cups off the fittings.

Herein, the term "snap fitting rim" also includes the term "snap fitting edge" or any other snap fitting structure capable of holding the push-on suction cup during operation of the conveyor belt for transporting and/or lifting goods.

According to a second aspect and an embodiment of the present invention, there is provided a push-on suction cup for a push-on fitting according to the first aspect. The push-on suction cup comprises a push-on base part having a mounting washer provided with a hole having a diameter smaller than a largest diameter of the snap fitting rim.

The push-on fitting and suction cup according to the invention also permits simplified assembly and disassembly during service and maintenance. Typically, a tool designed for assembling/disassembling the suction-cups are provided such that the flexible tongues comprising a concentric snap fitting rim having a variable diameter can be varied by an end part of the flexible tongues being acted upon.

BRIEF DESCRIPTION OF DRAWINGS

Different embodiments of the present invention will be described in more detail below with reference to the appended drawings, in which, FIG. 1 schematically in cross-section shows a push-on fitting for a push-on suction cup and a push-on suction cup assembled/mounted thereon according an embodiment, respectively;

FIG. 2a-b shows, in two partially cross-sectional views, assembly of the suction cup in FIG. 1.

DETAILED DESCRIPTION OF EMBODIMENTS

Figure 3A:
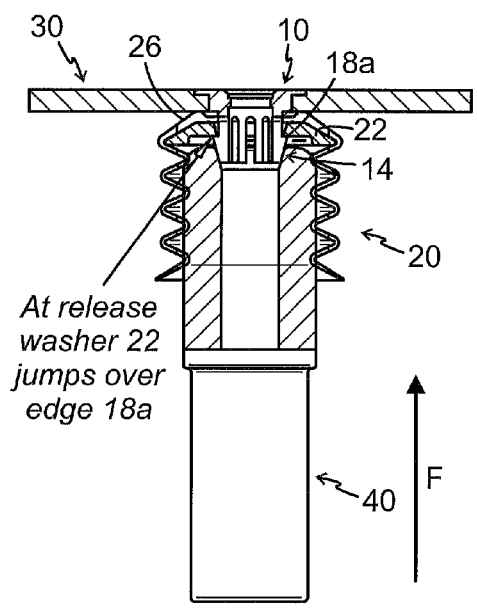
FIG. 3a-b shows, in two partially cross-sectional views, assembly of the suction cup in FIG. 1.

Now is referred to FIG. 1, which schematically in cross-section shows a push-on fitting 10 for a push-on suction cup 20 and a push-on suction cup 20 mounted thereon according an embodiment of the present invention, respectively.

In FIG. 1, the push-on fitting 10 and push-on suction cup 20 is shown assembled/mounted together and mounted to a conveyor belt 30 in a ready-to-operate or operating mode. For simplicity, only one push-on fitting 10, a push-on suction cup 20 and only a part of the conveyor belt 30 is shown and since other parts of the equipment for transporting or lifting goods, such as vacuum pipes etc. are of conventional type, they are well-known to the skilled person and therefore not further shown or described.

The push-on fitting 10 comprises a base disc 11 having a front 12 side and a rear 13 side and is adapted to be mounted in a hole 32 having a diameter D of the conveyor belt 30. The base disc 11 has a hole 15 for through airflow (typically caused by a negative pressure in a medium such as air, in particular provided as vacuum), having a diameter $D_{airflow}$, as an example 9 mm, equal to the diameter of the hole 32 (not shown or mentioned explicitly since well-known for the skilled person) of the conveyor belt 30 minus a wall-thickness (not shown or mentioned explicitly since well-known for the skilled person) of the push-on fitting 10, and is provided with a hollow push-on snap fitting pin 14, of the same diameter $D_{airflow}$ as the hole 15 in the base disc 11, for through airflow (illustrated by an arrow "air"). The snap fitting pin 14 extends outwardly essentially perpendicular to the front side 12 and is adapted to receive a push-on suction cup 20. The snap fitting pin 14 comprises at least a pair of axial, axially in relation to a longitudinal axis of the pin 14, slots 16 adapted to provide at least a pair of flexible tongues 14a, 14b formed in an end part 17 of the snap fitting pin 14. The flexible tongues 14a, 14b, flexible in a direction perpendicular to the longitudinal axis of the pin 14, comprise a concentric (concentric to the pin 14) snap fitting rim 18 having a variable (shown by a dashed line for a smaller diameter) diameter D1 that can be varied by the end part 17 of the flexible tongues 14a, 14b being acted upon, for receiving the push-on suction cup 20 provided with a push-on base part 22, and in particular a washer, in the following also referred to as "22", also having a mounting hole 23 with a diameter D2 smaller than a largest diameter (see solid line of D1) of the rim 18 when not acted on the end part 17.

Herein, the expression "adapted to be mounted in a hole 32 of the conveyor belt 30" as regards the push-on fitting means that the push-on fitting can be made as one entire piece intended to be able to mount only by using hand-force with or without a tool by pressing the push-on fitting 10 into the hole 32. Alternatively, some type of screw-joint joining two pieces of the push-on fitting together, one from the front side of the conveyor belt 30 and one piece from the rear side of the conveyor belt, when mounting into the hole 32 of the conveyor belt 30 can be used instead.

The height of the push-on fitting 10, and in particular the height of a part thereof inside a bilge part 25 is typically adapted such that products lifted by the bilge part are not harmed. This is however obvious for the skilled person to adapt and therefore not described in more detail.

According to an embodiment, a pair of axial slots 16 is formed inwardly (inwardly as seen from the end part 17 towards the base disc 11) of the tongues 14a, 14b, so that these connect only through one respective bridge to a cylindrical base section (not shown explicitly) of the tongues 14a, 14b. Alternatively, two pairs, or even more, pairs of axial slots 16 can be provided, whereby the number of flexible tongues 14a, 14b can be four or more. The push-on fitting 10 is typically made of the same material all through and can for instance be made of polyamide, but also other suitable polymer materials including other plastics can be used.

According to an embodiment, the base disc 11 can on the front side 12 be provided with a front flange 12a adapted to prevent the base disc 11 from leaving the conveyor belt 30 at assembly of the push-on suction cup 20.

According to an embodiment, the base disc 11 can on the rear side 13 be provided with a rear flange 13b adapted to prevent the base disc 11 from leaving the conveyor belt 30 at disassembly of the push-on suction cup 20.

In the embodiment shown in FIGS. 1-3, the end part 17 has a rotationally symmetric shape comprising two semi-circular tongues 14a, 14b facing each other to a cylindrical cross-sectional shape, but also other shapes such as square, or rectangular cross-sectional shape are also possible provided the tongues 14a, 14b are still flexible such that a cross-sectional area of the end part 17 and thereby the diameter of the rim 18 can be decreased when acted upon the end part 17, typically by the mounting tool 40, but not limited thereto.

The rim 18 can be semi-circular around the circumference of the pin 18. Instead of a rim 18 other snap-on means such as an edge or the like can be provided instead for the rim 18, provided the snap-fitting as described can be obtained. Thus, the term "rim" is to be understood as including at least the term "edge".

Now is referred also to FIG. 2a, 2b showing in two partially cross-sectional views, assembly of the suction cup for instance in FIG. 1. In FIG. 2a it is shown the how a push-on suction cup 20, for instance the one shown in FIG. 1 (but before assembly), comprising a push-on base part 22 having or being provided as a (mounting) washer (also referred to as reference numeral "22" in the following) provided with a hole 23 having a diameter D2 smaller than a largest diameter D1, when the tongues 14a, 14b are not acted upon, of the rim 18 is held by a mounting tool 40, which may be embodied as a hollow tube adapted to receive and hold (by friction) the push-on suction cup 20. The washer 22 may be integrated with or separate (for mounting in the bilge part 25 before assembly) to a bilge part 25 of the push-on suction cup 20. The bilge part 25 can be short or long and adapted to differing levels and different lifting movements.

The washer 22 can be made of at least two different materials having different flexibility, wherein an inner part 22a of the washer 22 surrounding the hole 23 is more rigid than an outer part 22b being more flexible. Additional reinforcement rings for increased stability, for instance made of polyimide, can be provided into the push-on suction cup 20.

The suction cups are typically made of materials approved by the FDA (for instance according to FDA 21 CFR 177.2600) and the European Union, for instance according to EU directive 1935/2004. The suction cups can be transparent and with or without colour pigment, or any traceable material, but are often provided with traceable material such as magnetic material, typically if used in the food industry for instance.

FIG. 2a shows the push-on suction cup 20 held by the mounting tool 40 just before mounting/assembling to the push-on fitting 10, and FIG. 2b during mounting/assembling. The arrow shows a force F applied on the mounting tool 40 (by an operator, service personnel or the like) during mounting/assembling. The force is powerful enough to act on the end part 17 and press the flexible tongues 14a, 14b together enough for the washer 22 to "jump over" an edge 18a of the rim 18. To be able to press properly on the end part 17 and be able to press the flexible tongues properly together to decrease the variable diameter D1 of the rim 18, the shape of an end part 42 of the mounting tool 40 adapted to press on the end part 17 of the flexible tongues 14a, 14b typically corresponds to the shape of the end part 17, for instance they are both wedge shaped in the form of a truncated cone having larger diameter D1 towards the base part 11 (seen from a direction corresponding to a mounting direction as illustrated by a line in FIG. 2a). At least, the mounting tool 40 has to be able to press the flexible tongues 14a, 14b together to decrease the diameter D1 of the end part 17 when acted upon by a pressing force F on a side part of 14c the truncated cone.

As shown in FIG. 2b, when the mounting tool 40 presses on the side part 14c, and the diameter D1 is decreased, finally the hole 23 of the washer 22 "jumps" over the edge 18a of the rim 18 and snaps-on the pin 14 since the diameter D2 of the hole 23 of the washer 22 is smaller than the diameter D1 of the pin, when the pressure on the end part 17 is not applied anymore and also locks on due to a resilient force exerted by a bottom part 26 of the push-on suction-cup 20, typically since the washer 22 is provided with elastic material pressing the washer 22 away from the front side 12.

According to an embodiment, a distance d of the pin 14 between the front side 12 and a lower end (herein, the term "lower" means closer to the front side) of the rim 14 is adapted such that a mounted suction-cup 20 is locked by a resilient force (not shown explicitly) exerted by a resilient bottom part 26 (which may even be the push-on part 22 itself) of the suction-cup 20 within this distance d.

Figure 3B:
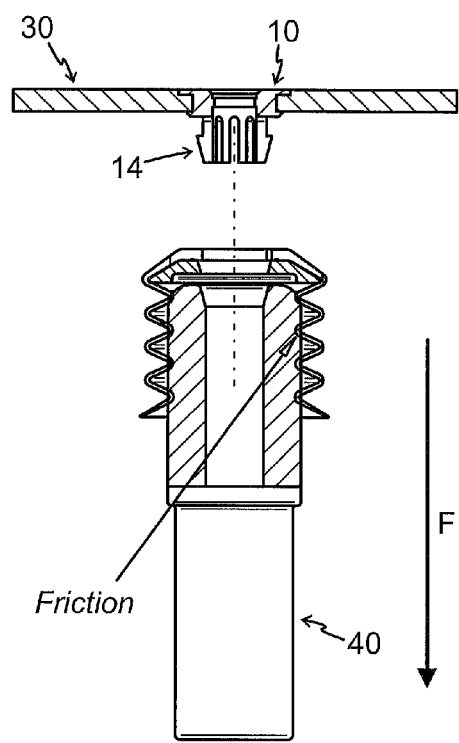

Now is referred to FIGS. 3a and 3b showing in two partially cross-sectional views, assembly of the suction cup in FIG. 1.

To release the push-on suction cup 20 from the push-on fitting 10, the mounting tool 40 is pressed against the push-on fitting 10 in the same way as during assembling (see above) until the hole 23 of the washer 22 jumps over the edge 18a of the rim 18 and comes loose. Because of the resilient force action on the bottom part 26 of the push-on suction cup 20, the push-on suction cup 20 will be pushed away from the push-on fitting 10 and comes loose such that the push-on suction cup 20 can be exchanged for instance. Because of friction force the push-on suction cup 20 will remain in the tool 40 during disassembly (as shown by the wording "friction" in FIG. 3b).

FIGS. 1-3 show views of from above of the pin 14, wherein it is shown that the flexible tongues 14a, 14b are rotationally symmetric bodies. While this design is the most preferred embodiment in aspects of production, maintenance and construction for different applications, the invention is in no way to be limited to flexible tongues having the shown design, as it is obvious to those skilled in the art that many of the advantages of the invention may also be implemented in tongues of other sectional shapes.

The invention has here been described with reference to specific embodiments only for illustrative purposes only. The claimed scope of protection is thus drafted to accommodate also such considered embodiments that are not specifically shown here but lie within the knowledge of those skilled in the art to practice with the guidance of the above description.

The invention claimed is:

1. A push-on fitting for a push-on suction cup for a conveyor belt for transporting and/or lifting goods, which push-on fitting comprises a base disc having a front side and a rear side and being adapted to be mounted in a hole of the conveyor belt, said base disc having a hole for through airflow and being provided with a hollow push-on snap fitting pin for through airflow, said pin extending outwardly essentially perpendicular to the front side and adapted to receive a push-on suction cup, wherein the snap fitting pin comprises at least a pair of axial slots adapted to provide at least a pair of flexible tongues formed in an end of the pin and in that the flexible tongues comprise a concentric snap fitting rim having a variable diameter, that can be varied by an end part of the flexible tongues being acted upon, for receiving the push-on suction cup provided with a push-on base part having a mounting hole with a diameter smaller than a largest diameter of the rim, and wherein the base disc on the front side is provided with a front flange adapted to prevent the base disc from leaving the conveyor belt at assembly of the push-on suction cup.

2. The push-on fitting according to claim 1, wherein the base disc on the rear side is provided with a rear flange adapted to prevent the base disc from leaving the conveyor belt at disassembly of the push-on suction cup.

3. The push-on fitting according to claim 1, wherein the flexible tongues are rotationally symmetric bodies.

4. The push-on fitting according to claim 3, wherein the flexible tongues have a semi-circular cross section.

5. The push-on fitting according to claim 1, wherein a distance of the pin between the front side and a lower end of the rim is adapted such that a mounted suction-cup is locked by a resilient force exerted by a resilient base part of the suction-cup within this distance.

6. The push-on fitting according to claim 1, wherein the end part of the flexible tongues has the form of a truncated cone.

7. A push-on suction cup for a push-on fitting that comprises a base disc having a front side and a rear side and being adapted to be mounted in a hole of a conveyor belt for transporting and/or lifting goods, the base disc having a hole for through airflow and being provided with a hollow push-on snap fitting pin for through airflow, the pin extending outwardly essentially perpendicular to the front side and adapted to receive the push-on suction cup, wherein the snap fitting pin comprises at least a pair of axial slots adapted to provide at least a pair of flexible tongues formed in an end of the pin and in that the flexible tongues comprise a concentric snap fitting rim having a variable diameter, that can be varied by an end part of the flexible tongues being acted upon, for receiving the push-on suction cup, the push-on suction cup comprising a push-on base part having a mounting washer provided with a hole having a diameter smaller than a largest diameter of the rim, and wherein the mounting washer is made of at least two different materials having different flexibility, wherein an inner part of the washer surrounding the hole is more rigid than an outer part being more flexible.

* * * * *